United States Patent

[11] 3,622,183

| [72] | Inventor | James C. White<br>P. O. Box 5495, Station B, Greenville, S.C. 29606 |
|---|---|---|
| [21] | Appl. No. | 866,485 |
| [22] | Filed | Oct. 15, 1969 |
| [45] | Patented | Nov. 23, 1971 |

[54] COUPLING ASSEMBLY FOR FLEXIBLE TUBING
8 Claims, 7 Drawing Figs.

[52] U.S. Cl. ................................................ 285/179,
    285/131, 285/256, 285/259, 285/397
[51] Int. Cl. ................................................ F16l 33/20
[50] Field of Search ........................................ 285/255,
    242, 259, 256, 184, 239, 260, 238, 174, 179, 131, 397

[56] References Cited
UNITED STATES PATENTS

| 186,855 | 1/1877 | Leland | 285/255 |
|---|---|---|---|
| 884,461 | 4/1908 | Browne | 285/259 X |
| 1,064,154 | 6/1913 | Miller | 285/255 |
| 1,723,273 | 8/1929 | Erwin | 285/255 |
| 1,863,870 | 6/1932 | Moore | 285/259 X |
| 2,200,082 | 5/1940 | Guarnaschelli | 285/255 X |
| 2,686,066 | 8/1954 | Paguin | 285/256 X |
| 2,805,088 | 9/1957 | Cline et al. | 285/259 |
| 3,078,109 | 2/1963 | Jackson et al. | 285/259 X |

FOREIGN PATENTS

| 225,005 | 10/1959 | Australia | 285/242 |
|---|---|---|---|
| 873,095 | 7/1961 | Great Britain | 285/242 |

*Primary Examiner*—Thomas F. Callaghan
*Attorney*—Newton, Hopkins & Ormsby

ABSTRACT: A tubular coupling for connection with high-pressure or vacuum tubing including a hollow elongate connector member and a locking member slidably received thereon. The elongate connector member includes a bendable reduced-diameter central portion and an enlarged bulbous portion at one end thereof. The locking member is a hollow sleeve tapered at one end to be slidably received along the reduced-diameter central portion of the connector member while the main body thereof is slidably received over the bulbous portion of the connector member. When flexible tubing is inserted over the bulbous portion and reduced-diameter portion of the connector member, the sleeve can be slid over the tubing to clamp the tubing to the connector member and the connector member bent in the reduced-diameter portion to provide a noncollapsible bend in the tubing.

PATENTED NOV 23 1971　　3,622,183
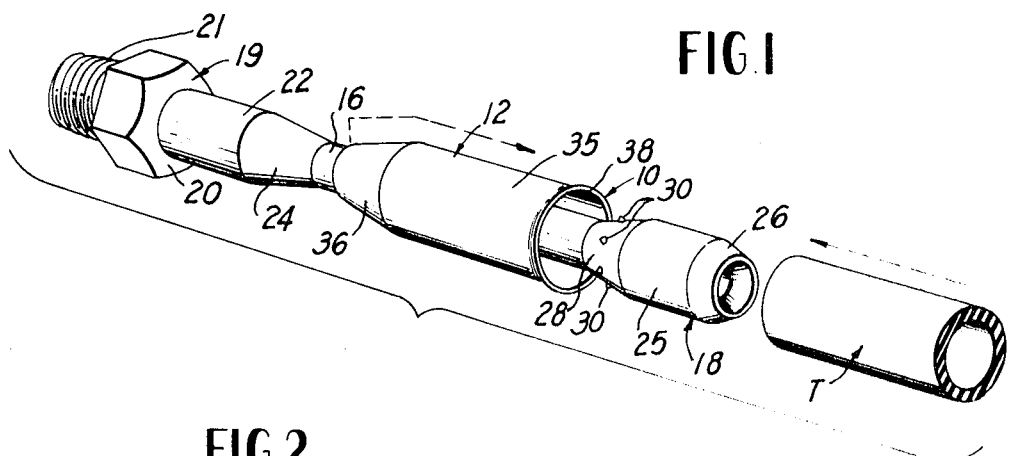
FIG.1
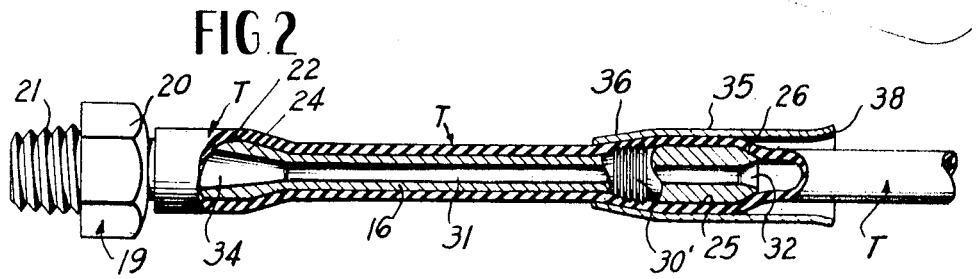
FIG.2
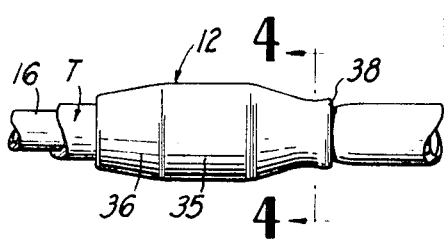
FIG.3
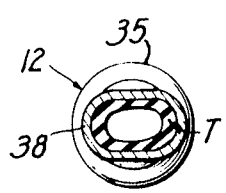
FIG.4
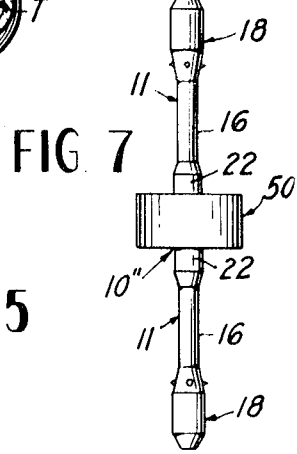
FIG.7
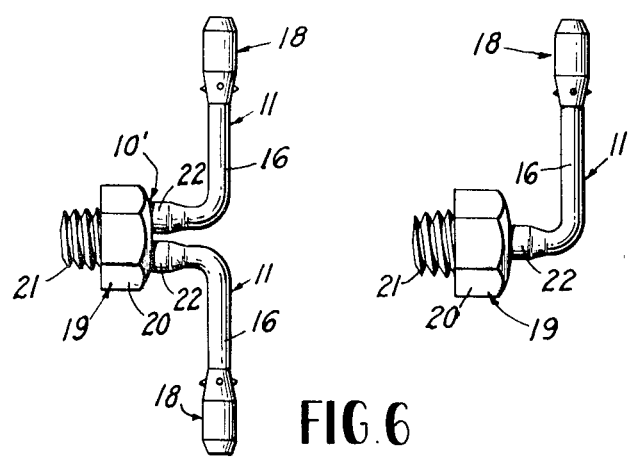
FIG.5
FIG.6
INVENTOR
JAMES C. WHITE
BY Newton, Hopkins & Ormsby
ATTORNEYS

COUPLING ASSEMBLY FOR FLEXIBLE TUBING

BACKGROUND OF THE INVENTION

Flexible tubing is frequently used in high-pressure or vacuum systems to route fluids to the desired location. One of the problems in using flexible tubing in such systems has been the inability of the flexible tubing to be formed into prescribed bends due to the tendency of the tubing to straighten out, flatten or kink at the bend under the influence of the internal and external pressure differential on the tubing as well as the mechanical forces exerted thereon.

SUMMARY OF THE INVENTION

These and other problems and disadvantages associated with the prior art are overcome by the present invention in that a coupling assembly is provided which not only provides means whereby a flexible tube may be quickly and easily connected in a high-pressure conduit system, but also the coupling assembly allows prescribed radius bends to be established and maintained in the conduit system.

Briefly stated, the coupling assembly of the present invention includes an elongate tubular member having an intermediate reduced-diameter cylindrical portion and a bulbous end portion, the flexible tubing being forced over the bulbous end portion and along the cylindrical portion. A locking member is provided for cooperating with the bulbous portion and is adapted to be slid over the cylindrical portion of the tubular member into clamping engagement with the flexible tubing, serving to maintain the same in clamped relation against the bulbous portion. The sleeve is of a length which allows it to project beyond the free end of the bulbous portion and to be crimped to assure positive engagement of the sleeve around the bulbous portion. The material from which the tubular member is made is relatively stiff but bendable so that its reduced-diameter cylindrical portion may be bent to thereby establish and maintain a bend in the tubing or conduit system. The end of the coupling assembly opposite the bulbous portion thereof is provided with a connector which may be adapted for connection to any part of the conduit system or to another similar piece of tubing.

BRIEF DESCRIPTION OF THE DRAWING FIGURES

FIG. 1 is a perspective view showing the coupling assembly according to the present invention and an end portion of a flexible tube to be associated therewith;

FIG. 2 is an elevational view partly broken away showing another illustrative embodiment of the invention operatively associated with the flexible tubing;

FIG. 3 is an elevational view showing the sleeve in a crimped condition as applicable to either of the embodiments shown in FIGS. 1 and 2;

FIG. 4 is a transverse section taken substantially along the plane of section line 4—4;

FIG. 5 is a view illustrating the coupling assembly in bent condition;

FIG. 6 is a view illustrating a modified form of coupling assembly; and, ILLUSTRATIVE FIG. 7 is a view illustrating a modified form of the coupling assembly for use as an in-line coupling.

DETAILED DESCRIPTION OF ILLUSTRATIVE EMBODIMENTS

A first embodiment of the invention is shown in FIGS. 1 and 5 and is used for connecting a flexible tubing to a threaded aperture in the conduit system of a high-pressure or high-vacuum fluid system. The invention includes a coupling assembly 10 comprising an elongate tubular connector 11 and a locking member 12.

The connector 11 includes a reduced-diameter central portion 16, an enlarged bulbous portion 18 at one end thereof and a threaded nipple 19 at the other end thereof. The nipple 19 includes a hexagonal driving portion 20 and an externally threaded end 21 so that the threaded end 21 can be screwed into an appropriate aperture (not shown) of the conduit system using the wrenching surfaces of the driving portion 20 in conventional manner. The nipple 19 is connected to the reduced-diameter central portion 16 through an enlarged-diameter cylindrical portion 22 and a tapered portion 24.

The enlarged bulbous portion 18 includes a cylindrical main body 25 with a tapered free end 26 and a corresponding tapered opposite end 28 connecting the main body 25 with central portion 16. The tapered end 28 is provided with a plurality of circumferentially spaced sharp upstanding studs 30 to engage a piece of high-pressure or vacuum tubing T.

The connector M defines a central passage 31 therethrough as best seen in FIG. 2 with an outwardly flaring mouth 32 at the entrance end of the passage and an outwardly flaring discharge 34 at the exit end of the passage. The passage 31 is designed to give the proper venturi effect to compensate for the insertion of the connector 11 in the fluid flow through the tubing T.

The tubing T is inserted over the bulbous portion 18, the reduced-diameter central portion 16 and over the enlarged cylindrical portion 22 adjacent the nipple 19. The external diameter of the central portion 16 is slightly larger than the normal internal diameter of the passage through the tubing T so that, not only is the tubing T stretched by portions 18 and 22, but also by central portion 16. This serves to maintain a tight fit between tubing T and connector 11 to keep the tubing T on connector 11 and prevent leakage of the fluid through the coupling. The studs 30 serve to engage the tubing T and prevent it from slipping off of the connector 11.

After the tubing T has been placed on connector 11, the connector 11 may be bent in the reduced-diameter central portion 16 to a prescribed radius and will remain in this condition without kinking, flattening or straightening out due to the pressure differential thereon or the mechanical forces acting thereon. The enlarged portion 22 and tapered portion 24 adjacent nipple 19 causes the bending of central portion 16 to take place sufficiently far from nipple 19 to prevent improper bend formation. Further, the resiliency of tubing T serves to maximize the bend radius in portion 16 so that a smooth bend is formed in connector 11 as seen in FIG. 5.

The locking member 12, as seen in FIG. 1 but omitted in FIG. 5 for clarity, is provided for further locking the tubing T onto connector 11 when the fluid pressure is such that the connector 11 alone cannot maintain the tubing T thereon. It is slidably received along the connector 11 over the tubing T to cooperate with the bulbous portion 18 to lock the tubing T thereon. The member 12 is illustrated as a sleeve having a main cylinder 35 and a tapered section 36 integral therewith. The main cylinder 35 has an outwardly flared mouth 38 and is of a diameter sufficient to tightly fit over that portion of tubing T around the main body 25 of the bulbous portion 18 while having a length greater than the length of the body 25 so that it extends over the free end portion 18 when it is in position. The tapered section 36 is constructed to force the tubing T tightly against the tapered end 28 of portion 18 and into engagement with the studs 30 in a manner best seen in FIG. 2 while limiting the movement of sleeve 12 relative to portion 18. Once the member 12 is in position as seen in FIG. 2, the free end thereof adjacent mouth 36 may be crimped as seen in FIGS. 3 and 4 to further lock the tubing T onto connector 11.

That embodiment of the coupling 10 shown in FIG. 2 is identical to that shown in FIG. 1 except that the studs 30 have been replaced by a plurality of circumferentially extending ribs 30'. The ribs 30' serve the same purpose as studs 30 and cooperate with the locking member 12 and tubing T as do the studs 30.

The material for the connector 11 and more particularly the elongate central portion 16 thereof, is of such nature as to impart sufficient rigidity to the portion 16 as will allow it to be bent as indicated for example in FIG. 5 but, once having been bent, to resist straightening thereof so as to maintain a prescribed radius. Thus, a high-pressure fluid conduit system incorporating couplings according to the present invention may be used not only to effect a rapid and simple means for connecting the flexible tubing but also to allow prescribed and perhaps small radius bends to be made in the system which will maintain their direction and angularity in use.

FIG. 6 illustrates a double coupling 10' which includes two connectors 11 connected to a single nipple 19. The locking members 12 are omitted for clarity and the connectors 11 are shown in their bent condition. The parts thereof correspond to like parts in FIG. 1.

FIG. 7 illustrates an in-line or continuing coupling 10'' which includes two connectors 11 forming a common passage (not shown). The enlarged-diameter central portion 22 of each connector 11 is connected to a separator 50 so that when the ends of two pieces of tubing T are inserted thereon, fluid can flow from one piece of tubing to the other. While the connectors 11 are shown with no locking member 12, it is to be understood that such members 12 could be provided as seen in FIGS. 1–4.

The present invention, therefore, is well adapted to carry out the objects and attain the ends and advantages mentioned as well as other advantages inherent therein. While the presently illustrative embodiments of the invention are given for the purpose of disclosure, numerous changes in the details of construction and arrangement of parts may be made which will readily suggest themselves to those skilled in the art and which are encompassed within the spirit of the invention.

I claim:

1. The combination with a flexible tubing of a tubular coupling including means at one end for connecting said coupling into a tubing system, a first portion adjacent said connecting means, a central portion of an external diameter slightly larger than the normal internal diameter of said flexible tubing and a bulbous portion at its other end of an external diameter larger than that of said central portion, said first portion being enlarged and tapered toward said central portion, the flexible tubing extending over said bulbous, central and first portions of said coupling and terminating adjacent said means for connecting said coupling member in a tubing system, said coupling being formed of a material which is bendable and, when bent, will retain its shape and the diameter length and thickness of its central portion being such that it may be bent at an angle of at least 90°.

2. The combination of claim 1 wherein said bulbous portion is provided with projections for engaging the inner surface of said flexible tubing to hold it against axial movement.

3. The combination of claim 1 in which the passage through the coupling is of uniform diameter in the central portion and is outwardly flared at each end to provide a venturi effect.

4. The combination of claim 1 in which the means for connecting the coupling into a tubing system is a threaded nipple.

5. The combination of claim 2 in which said bulbous portion comprises a cylindrical central section and a tapered section at each end thereof.

6. The combination of claim 5 in which there is further provided a sleeve having a cylindrical portion with a tapered portion at one end thereof, said cylindrical portion fitting snugly over said flexible tubing in the area of the cylindrical section thereof and said tapered section fitting snugly over said tubing adjacent the tapered section at one end thereof, thus protecting said tubing and holding it in place and against the projections on said bulbous portion.

7. The combination of claim 6 in which said sleeve is crimped to assure positive engagement around said sleeve.

8. The combination of claim 7 in which the central portion of the coupling is bent at a right angle.

* * * * *